3,146,870
PARTS ORIENTATION DEVICE

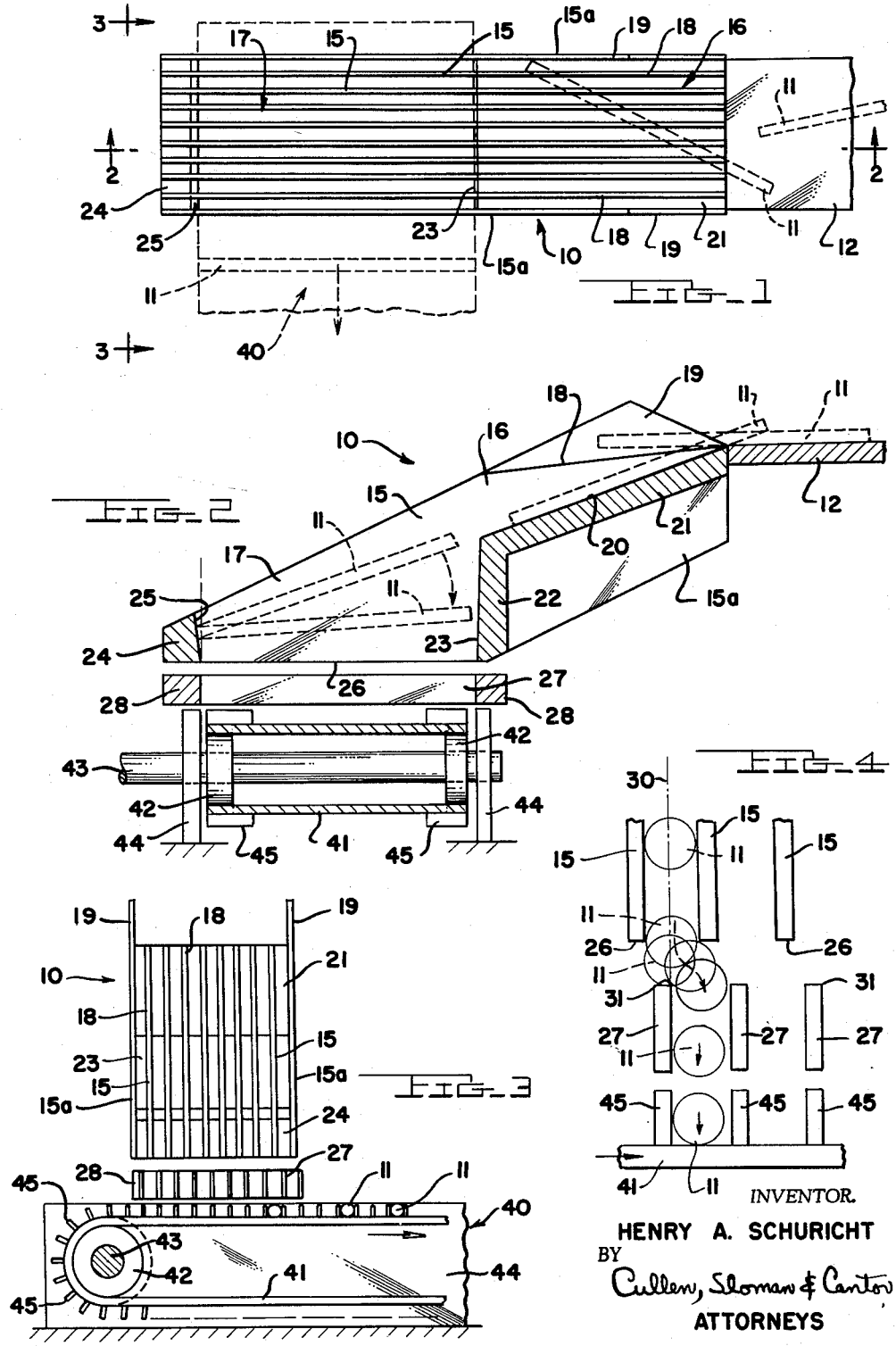

Henry A. Schuricht, Pontiac, Mich., assignor, by mesne assignments, to Hydromation Engineering Company, Plymouth, Mich., a corporation of Michigan
Filed Mar. 21, 1963, Ser. No. 266,838
5 Claims. (Cl. 193—43)

This invention relates to a parts orientation device and more particularly to a device useful for aligning long, narrow, rod-like parts.

In mass-production of long, narrow parts, such as automotive push rods and the like, it is frequently desirable to align parts which are received from a particular operation in random order and intermittently. Where the quantities of parts involved are very large, such as up to a rate of ten thousand parts an hour, it has not previously been possible to align such type parts at the rate received.

Hence, it is an object of this invention to provide a means for rapidly aligning without interruption, large quantities of long, narrow, rod-like parts which are rapidly and randomly discharged from one manufacturing operation and which are to be rapidly conveyed in alignment to a second manufacturing operation.

Another object of this invention is to form a parts alignment device which is simple in construction, which has no moving parts, and which is adapted to align large quantities of randomly received parts at the rate the parts are received.

These and other objects and advantages of this invention will become apparent upon reading the following description, of which the attached drawings form a part.

In these drawings:

FIG. 1 is a top, plan view of the parts orientation device with a parts removal conveyor shown schematically in dotted lines.

FIG. 2 is an elevational view taken in the direction of arrows 2—2 of FIG. 1, and FIG. 3 is an end view taken in the direction of arrows 3—3 of FIG. 1.

FIG. 4 is an enlarged fragmentary view of the discharge portion of the device.

The parts orientation device 10 is used to align parts 11 which are in the form of long, narrow, rod-like workpieces. For example, the parts may comprise metal, automotive push rods of a length of about 9½ to 10 inches and of a diameter of about ¼ inch. The parts are fed to the alignment device on a discharge chute 12 of a particular manufacturing operation (not shown) from which large quantities of parts, such as six to ten thousand parts per hour, are randomly and intermittently discharged. For example, the manufacturing operation may consist of a conventional, vibrating degreaser through which large numbers of parts are passed for cleaning, etc.

The orientation device 10 comprises a large number of vertically arranged, parallel, identical central blades 15 with side blades 15a. The blades together form a comb-like device having a forward, part receiving portion 16 and a rear, part discharge portion 17. The upper edges 18 of the blades 15, at the parts receiving portion, are downwardly sloped and are arranged at the end of the discharge chute 12 to receive parts sliding down the chute. The end blades 15a are extended upwardly to form side, confining walls 19. The lower edges of the blades 15 at the part receiving portion are also downwardly sloped at 20 and rest upon a sloping shelf 21 which terminates in a substantially vertically arranged guide wall 22 having a rearwardly facing guide wall surface 23 which slightly slopes downwardly and rearwardly relative to the vertical.

Between the blades, at the rear edges thereof, are arranged spacer or bumper blocks 24 which serve to hold the blades in spaced arrangement and in addition, are provided with bumper surfaces 25 which slope downwardly and forwardly (see FIG. 2). The lower edges 26 of the blades at the discharge portion are horizontally arranged.

Spaced beneath the blade lower edges 26 are a number of vertically arranged, thin strips 27 having horizontally arranged upper edges and joined together in spaced relationship by end blocks 28 arranged between the ends of the adjacent blades, which blocks also function as vertical guides.

Each strip 27 is located beneath the space between a pair of adjacent blades 15. As shown in FIG. 4, one face 29 of each strip is arranged coplanar with a plane 30 located midway between the adjacent pair of blades located above the strip. Each strip has an upper edge corner 31, located in the plane 30 and the face 29, and spaced from the lower edge 26 of one of the blades 15 a distance slightly greater than the diameter of the part, while the upper edge of the strip as a whole is spaced from the next adjacent blade 15 a distance slightly less than the diameter of the part. Thus, the part can only pass in one direction between the blades 15 and the upper edges of the strips.

Arranged beneath the strips is a conventional conveyor 40 which includes a belt 41 engaged with sprockets 42 carried upon a power driven shaft 43 journalled in support walls or plates 44. Lugs 45 are formed on the exposed surface of the belt 41 with the lugs being spaced apart a distance slightly greater than the diameter of a part.

Operation

In operation, parts rapidly slide down the chute 12 upon the sloped upper edges 18 of the blade receiving portion 16. In some cases, the chute 12 may be vibrated as in the case of conventional degreaser so that such vibrations transmitted to the blades are helpful in rapidly orienting the parts.

The parts which are confined between the end walls 19, roll about and strike each other while on the blade upper edges 18 and quickly drop into the spaces between adjacent blades. Each part falling between the blades, slides down the sloping shelf 21 (see FIG. 2) and its momentum carries it across the gap, which is slightly greater than the length of the parts, between the guide wall 22 and the bumper blocks 24. Each part strikes the sloping bumper surface 25 endwise and because of the slope, the striking end is momentarily frictionally detained so that the opposite end of the rod swings down rapidly (see arrow in FIG. 2) until the rod or part is almost horizontal, the rod then dropping downwardly between and beneath the lower edges 26 of the blades.

As shown in FIG. 4, the gravity dropping rod lands upon the upper edge of the strip located beneath the pair of blades and hesitates momentarily under the impact, so that it becomes horizontally aligned upon the strip. The part then rolls off the strip and drops downwardly between the strips upon the conveyor belt 41 between a pair of lugs 45.

This invention may be further developed within the scope of the following claims. Accordingly, it is desired that the foregoing description be read as being merely illustrative of an operative embodiment of this invention and not in a strictly limited sense.

I now claim:

1. A parts orientation device for aligning large quantities of randomly received, identical, rod-like, long, narrow parts, comprising a number of vertically arranged, parallel, spaced apart, identical blades, with the spacing between the blades being only slightly greater than the diameter of the rods, the blades forming a forward, parts receiving portion and a rear parts discharge portion; the upper and lower edges of the blades at the forward portion being downwardly sloped towards the rear portion and a sloping shelf arranged beneath the forward portion in contact with the lower edges of the blades so that the parts may drop between the blades, land on the shelf and endwise slide down the shelf into the rear portion; the spaces between the blades at the rear edges thereof being closed by a bumper having a forwardly facing bumper surface and the distance between the bumper and rear end of the shelf being only slightly greater than the length of said parts, so that the parts strike the bumper surface endwise and then drop vertically downwards; vertically arranged, parallel, thin strips having horizontal upper edges located beneath the blade rear discharge portion, each strip being located beneath and in vertical alignment with the space between a pair of adjacent blades, wherein each of the parts drop downwardly beneath the blades to land on an upper edge of a strip for horizontal alignment, and gravity roll off the strip to drop downwardly between and beneath the strips; and a conveyor means located beneath the strips for carrying off the aligned parts.

2. A device as set forth in claim 1 and wherein said bumper surface slopes downwardly and forwardly at a slight angle to the vertical for momentarily frictionally resisting downward movement of the part ends striking it to thereby permit the opposite ends of the parts to momentarily fall faster than the striking ends for horizontally aligning the parts.

3. A device as set forth in claim 2 and wherein the spaces between the blades at the rear end of the sloping shelf are closed by a substantially vertical guide wall extending downwardly to the lower edges of the blades at the rear parts discharge portion thereof for end alignment of the parts between the bumper surface and guide wall.

4. A construction as defined in claim 1, and wherein the lower edges of the blades at the rear portion are horizontally arranged and each of the strips are arranged with one of their vertical spaces coplanar with a plane passing midway between and parallel to the adjacent surfaces of its respective pair of adjacent blades and wherein the distance between the upper edge of the strip at said one face and its adjacent blade lower edge is slightly greater than the diameter of a part, while the upper edge of the strip at the opposite strip face is spaced a distance which is slightly less than the diameter of a part from the lower edge of the opposite blade, so that a part may roll off the strip in only one direction.

5. A device as set forth in claim 1 and wherein the end blade at each side of the number of blades is upwardly extended at the forward part receiving portion to form upwardly extending side walls for confining the parts upon the parts receiving portion.

References Cited in the file of this patent

UNITED STATES PATENTS 2,758,697    Schultz _____ Aug. 14, 1956